United States Patent Office 2,845,397
Patented July 29, 1958

2,845,397

METHOD OF CO-COAGULATING RESIN TREATED LIGNIN AND A RUBBER LATEX AND PRODUCT OBTAINED THEREBY

George S. Mills, Pompton Plains, N. J., assignor to United States Rubber Company, New York, N. Y., a corporation of New Jersey No Drawing. Application April 17, 1956
Serial No. 578,576

12 Claims. (Cl. 260—3)

This invention relates to lignin-reinforced vulcanizable rubber stocks, as well as to a method of making such stocks and to improved vulcanizates obtained from such stocks.

Formerly, tire treads and similar rubber products intended for severe abrasive usage were almost invariably compounded with carbon black as a reinforcing agent. The desire for a cheaper reinforcing material than carbon black has more recently led to the proposal that the rubber be reinforced with lignin, typically by mixing a solution of the lignin with the rubber latex and coprecipitating or otherwise recovering the mixed rubber and lignin solids, which could thereafter be processed much like ordinary rubber stocks. Such methods are disclosed in Patent 2,608,537 issued to Pollak on August 26, 1952, and in an article by Keilen and Pollak entitled "Lignin for Reinforcing Rubber," Ind. Eng. Chem. 39, 480–483 (April 1947).

I have now discovered that if the lignin is first treated with urea, or certain derivatives of urea, and formaldehyde, prior to mixing with the rubber latex and co-coagulating, I am able to produce rubber products having improved abrasion resistance along with other desirable physical properties. The improved lignin-reinforced rubber compositions made with lignin thus treated by my method are more easily vulcanized than conventional rubber-lignin compositions, thereby making it possible to employ less severe curing conditions and/or to employ less than the usually required quantity of curing agents.

The rubber latex used in the present invention may be natural rubber latex, or a conjugated diene polymer synthetic rubber latex, or mixtures of any of the same. Such conjugated diene polymer synthetic rubber latex may be an aqueous emulsion polymerizate of a 1,3-butadiene, such as 1,3-butadiene, 2-methyl butadiene (isoprene), piperylene, 2,3-dimethyl butadiene, or a mixture of such 1,3-butadienes. The conjugated diene polymer synthetic rubber latex may also be an aqueous emulsion polymerizate of a mixture of one or more of such 1,3-butadienes with one or more other polymerizable compounds which are capable of forming rubbery copolymers with 1,3-butadiene, for example, up to 70% of such mixture of one or more compounds which contain a single $CH_2=C<$ group where at least one of the disconnected valences is attached to an electro-negative group, that is, a group which substantially increases the electrical dissymmetry or polar character of the molecule. Examples of such monoolefines containing a terminal methylene ($CH_2=C<$) group which are copolymerizable with butadienes-1,3 are styrene, vinyl toluene, vinyl naphthalene, alpha methyl styrene, parachloro styrene, dichlorostyrene, alpha methyl dichlorostyrene, acrylic acid, methyl acrylate, ethyl acrylate, methyl methacrylate, acrylonitrile, methacrylonitrile, methacrylamide, methyl vinyl ether, methyl vinyl ketone, vinylidene chloride, vinyl carbazole, vinyl pyridines such as 2-vinyl pyridene and alkyl vinyl pyridines such as 2-methyl-5-vinyl pyridine.

The lignin used in the present invention is preferably the lignin commonly recovered by precipitation from its soluble sodium salt in the black liquor in the kraft sulfate process of wood pulping by acidification of the waste liquor. Lignin is readily soluble in aqueous alkali (e. g. alkali-metal hydroxide or ammonium hydroxide or amine solution) to form alkaline lignate solution, from which the lignin will precipitate on acidification. Modified lignins that are soluble in alkalies and insoluble in acids may also be used in the present invention. Examples of such modified lignins are oxidized lignin, slightly chlorinated lignin, slightly nitrated lignin, slightly sulfonated lignin (made either by partially desulfonating the sulfonated lignin made by the sulfite pulp process or by partially sulfonating alkali lignin made by the sulfate pulp process); such modified lignins are equivalent to the lignin made by acidification of waste liquor in the sulfate pulp process in the present invention.

In accordance with the invention, the lignin is first treated with urea, thiourea, dithiobiuret, or a dialkyl-thiourea (e. g., dimethylthiourea, diethylthiourea, dipropylthiourea, dibutylthiourea, or other dialkyl-thioureas) and formaldehyde, before admixing it with the rubber latex. As is well known, urea, thiourea, dithiobiuret, and dialkylthioureas have in common the property of forming resins when reacted with formaldehyde. This common property along with the phenolic nature of lignin is believed to be associated with the operability of this group of materials in the present invention. The treatment of the lignin with the stated reagents is accomplished while the lignin is dissolved or suspended in an aqueous medium, as described in detail in the next paragraph. The treating substance or substances are added to the lignin solution or suspension, the urea-type additive suitably in amount of from about 2 to 20% of the dry weight of the lignin, the formaldehyde suitably in amount from about 0.5 to 5 moles per mole of the urea-type additive. While the effects of the present invention may be obtained with room temperature treatment over a considerable period of time the lignin is preferably treated with the urea-type reagent and formaldehyde at moderately elevated temperatures, e. g. 140° F. to 250° F.; by digesting at such moderately elevated temperatures the treatment can usually be advanced to an appreciable extent within from 1 to 20 hours.

In the treatment of the lignin with a urea-type treating agent (e. g., urea, thiourea, dithiobiuret, or a dialkyl-thiourea) and formaldehyde, the lignin is preferably dissolved in an alkaline medium, e. g. a solution of an alkali-metal hydroxide or ammonium hydroxide or an amine of a pH from 8 to 14, after which the urea or urea derivative is added, followed by the formaldehyde. If desired, the lignin may be treated with the urea-type treating agent while suspended in neutral or acid aqueous medium, after which the treated lignin may be dissolved by adding alkaline material, followed by addition of the formaldehyde for further reaction. In a less preferred method of practicing the invention, the formaldehyde may be premixed with the urea, thiourea, dithiobiuret or dialkylthiourea, and partially reacted, and thereafter the premix may be added to the alkaline lignin solution for further reaction.

Regardless of the method of treatment, the lignin treated with the urea-type reagent and formaldehyde, in the form of an alkaline solution, is mixed with an alkaline rubber latex and the treated lignin and rubber cocoagulate recovered as by spray drying or coprecipitation as referred to above. The resulting masterbatch of rubber and the treated lignin is then washed and dried, and used to make compounded rubber stocks in essentially the same way that an ordinary solid rubber-carbon black masterbatch is employed, or that an ordinary rubber-unmodified lignin masterbatch is employed. The ratio of lignin component, that is, lignin before treatment, to the rubber component of the treated lignin-rubber masterbatch usually ranges from 25 to 100 parts to 100 parts of rubber.

It is also found to be advantageous to heat-treat the masterbatch at an elevated temperature for an additional period of time, say for a period of from 5 minutes to 1 hour with mastication, or from 2 to 10 hours statically, at a temperature of from 300° F. to 350° F. or even higher, provided care is taken not to heat the mixture so long or at such a high temperature as to cause thermal injury. To avoid pre-vulcanization such heat treatment will of course be carried out before the vulcanizing agent is added to the compound. This heat treatment may advantageously be catalyzed by addition of an acidic metal salt catalyst, such as zinc chloride, to the masterbatch. Such salts are known generally to catalyze reactions between urea and formaldehyde.

The following examples will serve to illustrate the practice of the invention in more detail. The lignin employed in these examples was a commercial material known as "Indulin A." It is purified pine wood alkali lignin derived from paper pulp sulfate black liquor. It is a brown, free-flowing amorphous powder typically having a specific gravity of 1.3, a moisture content of 4.3%, an ash content of 0.4%, an aqueous slurry pH of 3.4, a methoxyl content of 13.9%, an apparent density of 25 pounds per cubic foot, a fusion point of 250–275° C., and a sulfur content of 0.8–1.5%. It is insoluble in water and aqueous acids and in non-polar solvents. It is soluble in many polar solvents and in alkaline solutions.

EXAMPLE I

Part (a).—Thiourea-formaldehyde treatment 300 g. of Indulin A were dispersed in 1200 ml. of water which was continuously agitated in a one-gallon stainless steel beaker. The beaker was transferred to a hot plate, stirring continued, and 60 g. of thiourea dissolved therein. Thereafter, 60 g. of a 50% solution of sodium hydroxide were added. After warming the solution to 40° C., with continued stirring, 120 ml. of 37% formaldehyde were added. The beaker was covered, and with stirring continued over a period of two hours, the temperature was raised to 90°–100° C., and the solution was digested at that temperature for an additional hour, and then cooled to room temperature.

Part (b).—Urea-formaldehyde treatment

Part (a) of this example was repeated, except that urea was used in place of thiourea and triethanol amine was used in place of sodium hydroxide. The lignin was dissolved in 115 g. of triethanol amine in aqueous solution. 60 g. of urea and 150 ml. of 37% formalin were then added and the mixture was digested as above.

Part (c).—Thiourea-formaldehyde treatment

Part (a) of this example was repeated, except that the quantities of thiourea and formaldehyde were reduced by one-half, i. e., to 30 g. and 60 ml., respectively.

Part (d).—Urea-formaldehyde treatment

Part (a) was repeated, using 60 g. of urea in place of the 60 g. of thiourea.

Part (e).—Dithiobiuret-formaldehyde treatment

Part (a) was repeated, using 60 g. of dithiobiuret in place of the 60 g. of thiourea.

Part (f).—Diethyl thiourea-formaldehyde treatment

Part (a) was repeated, using 60 g. of diethylthiourea in place of the 60 g. of thiourea.

Each of the lignin solutions treated as in Parts (a) to (f) above, was blended directly with 4.25 kg. of a commercial GR-S type 1500 latex (an alkaline butadiene-styrene copolymer latex) containing 600 g. of rubber solids.

The solids were coprecipitated by running each mixture of a treated lignin solution and latex into a formic acid solution previously prepared by dissolving 100 ml. of 90% formic acid in 2.5 gal. of water. The coprecipitate or masterbatch was filtered off, washed, and dried, and could be compounded directly with conventional compounding ingredients according to conventional practice, to yield, upon vulcanization, products superior to rubber products reinforced with coprecipitated lignin that had not be treated with the urea-type reagent and formaldehyde.

Vulcanizable stocks A and B were compounded in accordance with the recipes shown in the table below from rubber-lignin masterbatches made similarly to the above masterbatches and produced from lignin treated as in the above Part (a) (20 percent thiourea), and Part (c) (10% thiourea), respectively. As controls, there were also included a stock C based on a lignin masterbatch in which the lignin had not been pre-treated, and a stock D based on an ordinary carbon black masterbatch.

The masterbatches for stocks A and B were first briefly mill mixed with 1 part per hundred of rubber of zinc chloride (added as a 10% solution in ether).

The masterbatch for stock C was prepared by mixing raw GR-S type 1500 with a 70 parts lignin: 100 parts GR-S type 1500 mixture, to yield a final mix containing 50 parts lignin: 100 parts GR-S (dry parts, by weight).

Stocks A and B, and also C, were then heat-treated by masticating in a Banbury mixer for 12 minutes at 330° F.

The masterbatch for stock D was a conventional 50 parts carbon black: 100 parts GR-S (type 1500) mixture. It was compounded according to a conventional tire tread formulation. First the carbon black and rubber were mixed on a mill at 250–280° F. stock temperature, and then the additional compounding ingredients such as benzothiazyl disulfide, diphenyl guanidine and sulfur were added in conventional amounts on a cold mill to complete the compounding of stock D.

The formulations of stocks A, B, C and D are summarized in the following table:

|  | Stock A<br>Example I, Part (a), Parts by Weight | Stock B<br>Example I, Part (c), Parts by Weight | Stock C<br>Untreated Lignin Control, Parts by Weight | Stock D<br>Carbon Black Control, Parts by Weight |
| --- | --- | --- | --- | --- |
| Rubber: |  |  |  |  |
| GR-S 1500 | 100 | 100 | 100 | 100 |
| Reinforcing Agent: |  |  |  |  |
| Treated Lignin— |  |  |  |  |
| Lignin | 50 | 50 |  |  |
| Thiourea | 10 | 5 |  |  |
| Formaldehyde | 8 | 4 |  |  |
| Untreated Lignin |  |  | 50 |  |
| Carbon black |  |  |  | 52 |
| Zinc chloride | 1 | 1 |  |  |

Additional ingredients added to stocks A, B, and C were as follows:

| Compounding Ingredients | A | B | C | D |
| --- | --- | --- | --- | --- |
| Carbon black (Spheron #4) | 2 | 2 | 2 | (Conventional carbon black reinforced tire tread formulation.) |
| Zinc oxide | 5 | 5 | 5 |  |
| Softener | 5 | 5 | 5 |  |
| Stearic Acid | 2 | 2 | 2 |  |
| Benzothiazyl disulfide | 1.5 | 1.5 | 1.5 |  |
| Copper dimethyl dithiocarbamate (Cumate) | 0.29 | 0.30 | 0.20 |  |
| Sulfur | 2.5 | 2.5 | 2.5 |  |

After the four stocks were cured for 45 minutes at 45 pounds' steam pressure, the physical properties of the stocks were determined to be as follows:

| | A | B | C | D |
|---|---|---|---|---|
| Durometer A Hardness | 69 | 69 | 71 | 60 |
| Stress at 300% Elongation | 1,490 | 1,370 | 1,230 | 1,350 |
| Tensile Strength (p. s. i.) | 4,170 | 4,030 | 2,890 | 3,410 |
| Percent Elongation at Break | 520 | 520 | 500 | 560 |
| Relative Laboratory Abrasion Rating | 142 | 125 | 100 | 73 |
| Torsional Hysteresis at Room Temperature | .410 | .420 | .400 | .344 |
| Torsional Hysteresis at 280° F | .196 | .228 | .205 | .140 |
| Tear at Room Temperature (pounds/inch) | 123 | 175 | 150 | |
| Tear at 212° F. (pounds/inch) | 122 | 99 | 48 | |

The physical properties of stocks A and B of the invention are clearly superior to those of the controls C and D.

Pneumatic tires were constructed, using the four stocks A, B, C and D in the tread, and the tires were road tested extensively. It was found that the stocks A and B of the invention had significantly greater resistance to wear in these tests than either the untreated lignin reinforced stock C or the carbon black reinforced stock D. The average relative resistances to wear of the four stocks in the road tests were as follows:

| | A | B | C | D |
|---|---|---|---|---|
| Relative Wear Resistance in Road Tests | 138 | 116 | 100 | 104 |

It will be observed from these data that although the untreated lignin control and the carbon black control gave about the same rates of wear in the road tests, the thiourea-formaldehyde treated lignin stocks both resulted in markedly improved wear resistance. The cost of carbon black is very much greater than that of the lignin, and the invention therefore confers a double benefit in the form not only of reduced cost, but also in the form of concomitant increased service life in pneumatic tire treads and similar articles.

For easier comparison of the carbon black stock D with the stocks A and B of the invention, the relative abrasion values may be recalculated on the basis of a value of 100 for the carbon black stock, with the following results:

| | D | A | B |
|---|---|---|---|
| Relative Wear Resistance in Road Tests | 100 | 133 | 112 |

The stocks A and B of the invention clearly are decidedly superior.

EXAMPLE II

A stock designated as stock E, which was essentially the same as stock A of Example I, was prepared, except that the heat treatment at 330° F. after addition of the zinc chloride was omitted. Instead, the masterbatch containing the zinc chloride was simply processed 12 minutes on a mill at room temperature. Afterwards, the remaining compounding ingredients were added, and the stock was cured for 45 minutes at 45 pounds' steam pressure. There was also prepared a stock F, like stock E, but containing no zinc chloride. The physical properties of the cured stocks A, E and F are compared in the following table:

| Stock | A | E | F |
|---|---|---|---|
| Feature | Hot-Milled with ZnCl$_2$ | Cool-Milled with ZnCl$_2$ | Cool-Milled without ZnCl$_2$ |
| Properties: | | | |
| Durometer A Hardness | 69 | 82 | 83 |
| Stress at 300% Elongation (p. s. i.) | 1,490 | 1,140 | 1,240 |
| Tensile Strength (p. s. i.) | 4,170 | 3,250 | 3,320 |
| Percent Elongation at Break | 520 | 510 | 510 |
| Relative Laboratory Abrasion Rating | 142 | 117 | 112 |
| Torsional Hysteresis at 280° F | 0.196 | 0.374 | 0.395 |

From the foregoing data, it will be seen that the hot-milled stock A is superior to the cold-milled stocks E and F; also, in the cold-milled stocks, use of zinc chloride is not essential, although some positive effect is shown.

As a cool-milled control for stocks E and F, the following control sample was prepared:

100 parts GR–S (type 1500) and 50 parts lignin were coprecipitated and placed on a cool mill. It was thereafter compounded and cured substantially in the same way as stocks A, E and F above.

The physical tests of the stock were:

| | |
|---|---|
| Modulus at 300% elongation | p. s. i. 1140 |
| Tensile | p. s. i. 3070 |
| Ultimate elongation | percent 500 |
| Durometer A hardness | 71 |
| Abrasion rating | 79 |

By comparing these results with stocks A, E and F of Example II above, it can be seen that the abrasion rating is considerably lower.

EXAMPLE III

In this example, the hot-milled stock A of Example I, reinforced with thiourea-formaldehyde treated lignin, was compared directly to a hot-milled stock G, reinforced with untreated lignin as a control and without zinc chloride, but otherwise essentially the same as stock A. Curing and physical testing gave the following results:

| | Stock A | Stock G |
|---|---|---|
| | Treated Lignin Hot-Milled with one part of ZnCl$_2$ | Untreated lignin Hot-Milled without ZnCl$_2$ (Control) |
| Time of Cure at 45 pounds steam, min | 45 | 90 |
| Durometer A Hardness | 69 | 67 |
| Stress at 300% Elongation (p. s. i.) | 1,490 | 1,290 |
| Tensile Strength (p. s. i.) | 4,170 | 3,240 |
| Percent Elongation at Break | 520 | 510 |
| Relative Laboratory Abrasion Rating | 142 | 100 |
| Torsional Hysteresis at 280° F | 0.196 | 0.219 |

It will be observed that the untreated lignin stock G, even with hot milling, required a cure time two times greater than the cure time for the treated lignin stock A, to achieve substantially the same level of cure. It will be observed that stock A was markedly superior in abrasion resistance and in tensile strength to stock G.

EXAMPLE IV

Example III was repeated, except that the zinc chloride was omitted from stock A, as well as from G; with essentially equivalent results.

EXAMPLE V

Example III was repeated, except that 1 part of zinc chloride was present in stock G as well as in stock A during the hot milling. The results were equivalent.

Examples II, IV and V, show that the zinc chloride although helpful in some instances and at no time detrimental, is not essential to the invention.

Example VI describes treatment of the lignin with the urea-type reagent in acid medium followed by alkalizing, reacting with formaldehyde and then mixing with the rubber latex.

EXAMPLE VI

*Part (a).—Thiourea-formaldehyde treatment*

240 g. of lignin (Indulin A) were suspended in 1000 ml. of water in a two-liter beaker equipped for stirring. The beaker was covered with aluminum foil and heated. 2 ml. of concentrated sulfuric acid, 2 ml. of a 25% solution of a commercial dispersing agent "Emulphor O" (a non-ionic, water-soluble polyoxyethylated long chain fatty alcohol supplied by General Dyestuff Corp.), and 48 g. of thiourea (20% by weight based on the lignin) were added. The mixture was then digested for 6 hours by heating at 90°–100° C., while stirring to prevent caking; it was then cooled.

55 g. of a 50% aqueous solution of sodium hydroxide were then added to the mixture at a temperature of 30°–40° C. while stirring. This quantity of alkali was sufficient to neutralize the acid and also provide approximately a 10% excess of alkali on the weight of the lignin. The lignin dissolved under the influence of the excess alkali.

90 ml. of a 37% solution of formaldehyde in water were added with stirring to the lignin solution. The solution was slowly heated to bring its temperature up to 90°–100° C. within 1 to 2 hours, and the solution was then further digested at this temperature for another hour, with continued slow agitation. The solution was thereafter cooled.

*Part (b).—Urea-formaldehyde treatment*

Part (a) of this example was repeated, except that 48 g. of urea were used in place of the 48 g. of thiourea.

The treated lignin solutions of Part (a) and of Part (b) of this Example VI were each mixed with 2840 g. of GR–S type 1500 latex to form masterbatches. The latex contained 600 g. of rubber solids, so that each mixture contained some 40 parts by weight of lignin per 100 parts of rubber. Each mixture was then added with stirring to a previously prepared solution of 82 ml. of 90% formic acid in 10 liters of water (approximately a 1% solution of formic acid) at a temperature of 80° C. This resulted in coprecipitation of the rubber solids along with the treated lignin finely dispersed therein. The resulting coprecipitate or masterbatch was filtered off, washed and dried. The resulting masterbatch of solid rubber crumbs reinforced with lignin treated with the thiourea-formaldehyde product could be further compounded and processed like ordinary rubber to provide vulcanizates equivalent to or superior to ordinary carbon black-reinforced rubber compounds, or superior to rubber compounds reinforced with coprecipitated lignin that had not been treated with thiourea and formaldehyde as described.

144 parts by weight of the modified lignin-rubber dried coprecipitate or masterbatch made from the thiourea-formaldehyde treated lignin of Part (a) of this Example VI were mixed briefly on a cool mill with 2 parts of zinc chloride in the form of a 10% solution in ether. The masterbatch containing the zinc chloride was then heat-treated by masticating on a mill for 12 minutes at a temperature of about 300° F. The purpose of this was to bring about a favorable interaction between the rubber and the thiourea-formaldehyde modified lignin in the masterbatch.

The thus heat-treated masterbatch was then compounded by incorporating on a cool mill the following compounding ingredients:

| Ingredient | Parts by weight (per 100 parts of rubber) |
|---|---|
| Zinc oxide (Kadox) | 5 |
| Hydrocarbon oil plasticizer (Paraflux) | 5 |
| Stearic acid | 2 |
| Benzothiazyl disulfide (MBTS) | 1.5 |
| Copper dimethyl dithiocarbamate (Cumate) | 0.28 |
| Sulfur | 2.5 |

As a control stock, there was also prepared a mixture of the above-tabulated compounding ingredients with 140 parts of rubber-lignin coprecipitate, in which the lignin was not treated with the thiourea-formaldehyde reaction product. The 140 parts of coprecipitate used in this control stock contained 100 parts of rubber and 40 parts of the untreated Indulin A. This control stock did not have zinc chloride added to it, but did receive the above-mentioned heat-treatment, and it was thereafter simply compounded in accordance with conventional practice.

Portions of the control stock and of the stock of the invention were vulcanized in a molding press for 45 minutes at 45 pounds of steam pressure, and the physical properties of the vulcanizates were then determined to be as follows:

| | Control (Reinforced with untreated Indulin A) | Invention (Reinforced with thiourea-formaldehyde treated Indulin A) |
|---|---|---|
| Durometer A Hardness | 66 | 66 |
| Stress at 300% Elongation (p. s. i.) | 950 | 1,450 |
| Tensile Strength (p. s. i.) | 2,880 | 2,930 |
| Percent Elongation at Break | 580 | 460 |
| Relative Laboratory Abrasion Rating | 100 | 141 |
| Torsional Hysteresis (at 280° F.) | 0.192 | 0.190 |
| S/R Ratio (The ratio of xylene absorbed to the weight of rubber hydrocarbon in a sample of vulcanizate after immersion for 24 hours in xylene) | 3.8 | 3.2 |

The masterbatch made from the urea-formaldehyde treated lignin of Part (b) of this Example VI was used to prepare stock H by mixing 144 parts of the masterbatch on a cold mill briefly with 2 parts of zinc chloride, added as a 10% solution in ether. The batch was then placed on a mill heated to 300° F. and masticated for 12 minutes, after which the additional compounding ingredients were added on a mill at room temperature, essentially as in the previous examples. A control stock J was similarly prepared except that the lignin was untreated and no zinc chloride was used. The control J was hot milled in the same manner as stock H. After curing, the relative laboratory abrasion ratings of the two stocks were found to be as follows:

| | Stock H | Stock J |
|---|---|---|
| Relative Laboratory Abrasion Rating | 138 | 100 |

It will be seen that the urea-formaldehyde treated lignin stock H was significantly improved in abrasive wear compared to the untreated lignin control stock J.

EXAMPLE VII

Stocks K, L, and M of this example were made up essentially as stock H in Example VI. The stocks contained 160 parts of the masterbatches (containing 100 parts of rubber and 50 parts of lignin with 10 parts of urea derivative-formaldehyde) obtained from the treated lignin of Parts (b), (e) and (f), respectively, of Example I, to which 2 parts of zinc chloride were added, followed by hot milling for 12 minutes at 300° F. These stocks were compounded essentially as in the previous examples, and there was also prepared a comparable control stock N, based on untreated lignin, that contained no zinc chloride but was also heat-treated. After curing as previously described, the relative laboratory abrasion ratings were as follows:

|  | K | L | M | N |
|---|---|---|---|---|
| Treatment of Lignin | Urea-formaldehyde. | Dithiobiuret-formaldehyde. | Diethyl thiourea-formaldehyde. | No treatment (control). |
| Relative Laboratory Abrasion Rating | 156 | 130 | 139 | 100. |

The treated lignin stocks K, L, M of the invention were thus markedly superior to the untreated lignin control N in resistance to abrasive wear.

EXAMPLE VIII

The procedure followed in preparing the masterbatch of this example is a variation in which lignin, the urea derivative, and formaldehyde were reacted in alkaline solution. Thiourea and formaldehyde were pre-reacted in concentrated aqueous solution, at a pH of about 8, and at a temperature of 90–100° C., just short of formation of an insoluble phase. The pre-reacted mixture was then further reacted with an alkali solution of lignin and blended and coflocculated with GR-S type 1500 latex substantially as described in previous examples. The coprecipitate was compounded and vulcanized samples were prepared substantially as described previously, and the physical properties of the vulcanized samples were determined. It was observed that the abrasion resistance was superior to that of a similar stock, in which the lignin was not treated with the pre-reacted thiourea-formaldehyde solution.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method which comprises mixing with a rubber latex an alkaline solution of lignin that has been treated with material selected from the group consisting of urea and formaldehyde, thiourea and formaldehyde, dithiobiuret and formaldehyde, and dialkylthiourea and formaldehyde, the urea-type additive being in amount from 2 to 20% based on the dry weight of the lignin and the formaldehyde being in amount from 0.5 to 5 moles per mole of urea-type additive, and the ratio of lignin to rubber being in the range of 25 to 100 parts of lignin to 100 parts of rubber, and co-coagulating the rubber and treated lignin in such mixture.

2. The method which comprises mixing with a butadiene-styrene copolymer synthetic rubber latex an alkaline solution of lignin that has been treated with material selected from the group consisting of urea and formaldehyde, thiourea and formaldehyde, dithiobiuret and formaldehyde, and dialkylthiourea and formaldehyde, the urea-type additive being in amount from 2 to 20% based on the dry weight of the lignin and the formaldehyde being in amount from 0.5 to 5 moles per mole of urea-type additive, and the ratio of lignin to rubber being in the range of 25 to 100 parts of lignin to 100 parts of rubber, and co-coagulating the rubber and treated lignin in such mixture.

3. The method which comprises mixing with a rubber latex an alkaline solution of lignin that has been treated with thiourea and formaldehyde, the thiourea being in amount from 2 to 20% based on the dry weight of the lignin and the formaldehyde being in amount from 0.5 to 5 moles per mole of thiourea, and the ratio of lignin to rubber being in the range of 25 to 100 parts of lignin to 100 parts of rubber, and co-coagulating the rubber and treated lignin in such mixture.

4. The method which comprises mixing with a rubber latex an alkaline solution of lignin that has been treated with urea and formaldehyde, the urea being in amount from 2 to 20% based on the dry weight of the lignin and the formaldehyde being in amount from 0.5 to 5 moles per mole of urea, and the ratio of lignin to rubber being in the range of 25 to 100 parts of lignin to 100 parts of rubber, and co-coagulating the rubber and treated lignin in such mixture.

5. A rubber stock comprising 100 parts of a rubber and from 25 to 100 parts of lignin that has been treated with material selected from the group consisting of urea and formaldehyde, thiourea and formaldehyde, dithiobiuret and formaldehyde, and dialkylthiourea and formaldehyde, the urea-type additive being in amount from 2 to 20% based on the weight of the lignin and the formaldehyde being in amount from 0.5 to 5 moles per mole of urea-type additive, the rubber and thus treated lignin having been co-coagulated from a mixture of rubber latex and an alkaline aqueous solution of the treated lignin.

6. A rubber stock comprising 100 parts of a butadiene-styrene copolymer synthetic rubber and from 25 to 100 parts of lignin that has been treated with material selected from the group consisting of urea and formaldehyde, thiourea and formaldehyde, dithiobiuret and formaldehyde, and dialkylthiourea and formaldehyde, the urea-type additive being in amount from 2 to 20% based on the weight of the lignin and the formaldehyde being in amount from 0.5 to 5 moles per mole of urea-type additive, the synthetic rubber and thus treated lignin having been co-coagulated from a mixture of butadiene-styrene copolymer synthetic rubber latex and an alkaline aqueous solution of the treated lignin.

7. A rubber stock comprising 100 parts of a rubber and from 25 to 100 parts of lignin that has been treated with thiourea and formaldehyde, the thiourea being in amount from 2 to 20% based on the weight of the lignin and the formaldehyde being in amount from 0.5 to 5 moles per mole of thiourea, the rubber and thus treated lignin havinge been co-coagulated from a mixture of rubber latex and an alkaline aqueous solution of the treated lignin.

8. A rubber stock comprising 100 parts of a rubber and from 25 to 100 parts of lignin that has been treated with urea and formaldehyde, the urea being in amount from 2 to 20% based on the weight of the lignin and the formaldehyde being in amount from 0.5 to 5 moles per mole of urea, the rubber and thus treated, lignin having been co-coagulated from a mixture of rubber latex and an alkaline aqueous solution of the treated lignin.

9. A product comprising a vulcanized rubber composition comprising 100 parts of a rubber and from 25 to 100 parts of lignin that has been treated with material selected from the group consisting of urea and formaldehyde, thiourea and formaldehyde, dithiobiuret and formaldehyde, and dialkylthiourea and formaldehyde, the urea-type additive being in amount from 2 to 20% based on the weight of the lignin and the formaldehyde being in amount from 0.5 to 5 moles per mole of urea-type additive, the rubber and thus treated lignin having been co-coagulated from a mixture of rubber latex and an alkaline aqueous solution of the treated lignin.

10. A product comprising a vulcanized rubber composition comprising 100 parts of a butadiene-styrene copolymer synthetic rubber and from 25 to 100 parts of lignin that has been treated with material selected from the group consisting of urea and formaldehyde, thiourea and formaldehyde, dithiobiuret and formaldehyde, and dialkylthiourea and formaldehyde, the urea-type additive being in amount from 2 to 20% based on the weight of the lignin and the formaldehyde being in amount from 0.5 to 5 moles per mole of urea-type additive, the synthetic rubber and thus treated lignin having been co-coagulated from a mixture of butadiene-styrene copolymer synthetic rubber latex and an alkaline aqueous solution of the treated lignin.

11. A product comprising a vulcanized rubber composition comprising 100 parts of a butadiene-styrene copolymer synthetic rubber and from 25 to 100 parts of lignin that has been treated with thiourea and formaldehyde, the thiourea being in amount from 2 to 20% based on the weight of the lignin and the formaldehyde being in amount from 0.5 to 5 moles per mole of thiourea, the synthetic rubber and thus treated lignin having been co-coagulated from a mixture of butadiene-styrene copolymer synthetic rubber latex and an alkaline aqueous solution of the treated lignin.

12. A product comprising a vulcanized rubber composition comprising 100 parts of a butadiene-styrene copolymer synthetic rubber and from 25 to 100 parts of lignin that has been treated with urea and formaldehyde, the urea being in amount from 2 to 20% based on the weight of the lignin and the formaldehyde being in amount from 0.5 to 5 moles per mole of urea, the synthetic rubber and thus treated lignin having been co-coagulated from a mixture of butadiene-styrene copolymer synthetic rubber latex and an alkaline aqueous solution of the treated lignin.

References Cited in the file of this patent

UNITED STATES PATENTS

| | | |
|---|---|---|
| 2,266,265 | Reiche et al. | Dec. 16, 1941 |
| 2,664,408 | Plump et al. | Dec. 29, 1953 |
| 2,676,931 | Pollak | Apr. 27, 1954 |